March 25, 1924.
P. P. BELT
1,487,913
PHONOGRAPH MOTOR
Filed June 10, 1921  2 Sheets-Sheet 1
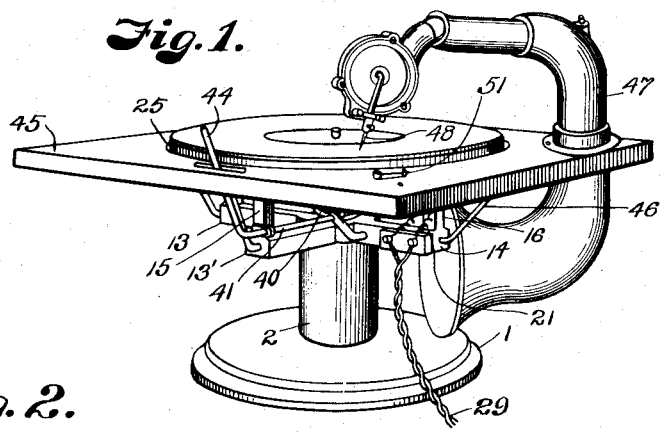
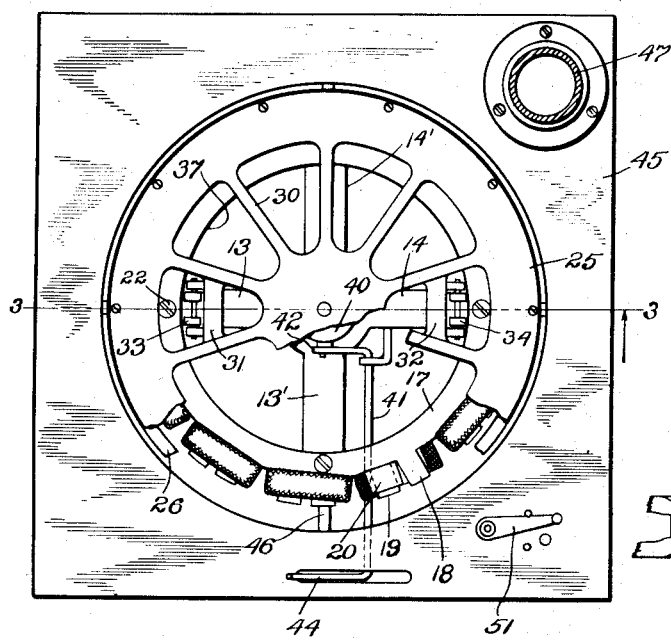
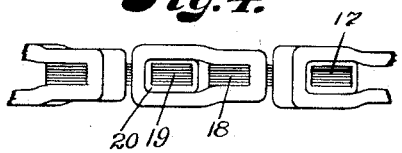
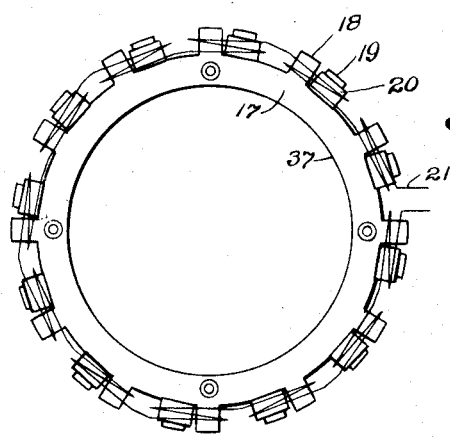
INVENTOR
Perley P. Belt.
BY
ATTORNEY March 25, 1924.

P. P. BELT

PHONOGRAPH MOTOR

Filed June 10, 1921  2 Sheets-Sheet 2

1,487,913

INVENTOR
Perley P. Belt.
BY Arthur E. Brown
ATTORNEY

Patented Mar. 25, 1924.

1,487,913

UNITED STATES PATENT OFFICE.

PERLEY P. BELT, OF FREDONIA, KANSAS.

PHONOGRAPH MOTOR.

Application filed June 10, 1921. Serial No. 476,476.

*To all whom it may concern:*

Be it known that I, PERLEY P. BELT, a citizen of the United States, residing at Fredonia, in the county of Wilson and State of Kansas, have invented certain new and useful Improvements in Phonograph Motors; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to phonograph motors and particularly to a motor for rotating a turntable used for disk records.

One of the objects of the invention is to provide a motor which will be practically silent while it is operating, it being one of the purposes of the invention to maintain a slow rotative speed of the operating mechanism or in other words, to control the motor so as to maintain the speed of the turntable within practical limits.

In actual practice I have found that a ring-shaped magnet may be efficiently utilized to drive a ring-shaped armature. The ring-shaped armature is preferably formed with strands or laminations of wire about its perimeter and the magnet is preferably within the perimeter of the armature and formed with laminations having radial pole pieces which may be connected in series by an approved form of winding.

It is also to be noted that the ring-shaped magnet may have any number of polar projections, that the armature or rotating element of the motor may be made of any appropriate form; that it may consist of copper or aluminum, that a channel is provided for the strands or laminations of wire and that the channel may also consist of any suitable material.

There are other novel details of construction of my invention, such as means for governing the speed of the rotor or armature, and these will be apparent by reference to the following description in connection with the accompanying drawings, in which Fig. 1 is a perspective view of a phonograph motor constructed in accordance with my invention.

Fig. 2 is a plan view of the motor, the sound reproducing horn or tube being shown in section and parts of the turntable being broken away to show the positions of the magnetic pole pieces and their windings.

Fig. 4 is a fragmentary edge view of the magnet.

Fig. 5 is a diagrammatic view of the magnet winding.

Figure 3:
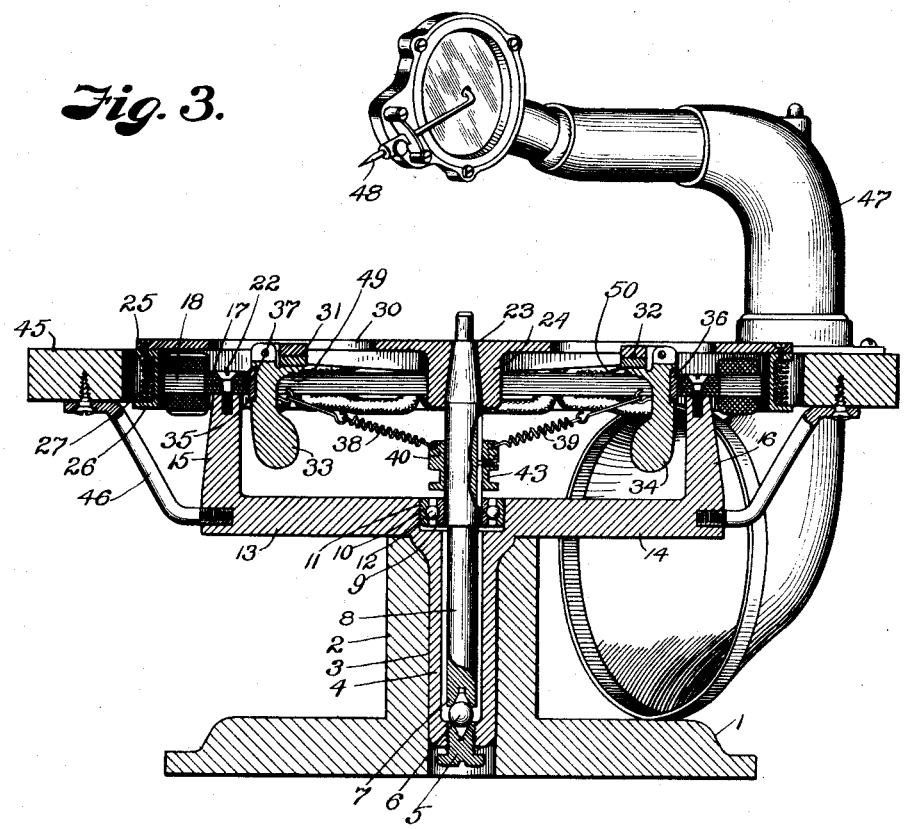
Fig. 3 is a cross sectional view on the line 3—3 of Fig. 2.

Referring now to the drawings:

1 designates a base of any appropriate construction having a standard 2 with a central, longitudinal opening 3 therein to receive a socket member or sleeve 4, in the bottom of which is an adjustable bearing plug 5, carrying a bearing ball 6 on which rests the end 7 of a vertical rotatable shaft 8, the diameter of which is less than the inner diameter of the sleeve 4. The shaft 8 carries a bearing collar 9, between which and a bearing ring 10 in the socket 11 of the sleeve 4 are bearing balls 12, which space the shaft 8 away from the sides of the sleeve 4 and which cooperate with the ball 7 in reducing the friction of the shaft, it being observed by reference to Fig. 3 that the bearing rings 9 and 10 are above the floor of the recess and that they may be held in such position by adjusting the plug 5.

The sleeve 4 carries two sets of diametrically opposite arms 13 and 14 and 13′ and 14′, having upstanding ends 15 and 16, to which are secured the ring-shaped laminations 17, which constitute the magnet and it will be observed that the laminations are provided with pairs of radial offset pole pieces, those in each pair being designated 18 and 19 respectively, the one designated 19 being provided with a copper sleeve 20.

The pole pieces are wound in multiple series, the winding wire 21, for example, passing around the copper sleeve 20 and the pole piece 18 in a clockwise direction for the first set and in a contra-clockwise direction for the second set, then in a clockwise direction for the third set, a contra-clockwise direction for the fourth set, and so on, alternating around the ring, as will be clearly seen in Fig. 5, it being understood that the device shown is wound for alternating current. The ring-shaped magnet is supported upon the radial arms and secured thereto by the fastening devices 22, shown as screws, as clearly seen in Figs. 2 and 3.

The upper end of the shaft 8 is provided with a taper 23 to receive the hub 24 of the turntable, which, in itself, constitutes the armature. The perimeter or rim 25 of the turntable carries a suspended channel shaped annulus 26 in which is wound a plurality of layers of iron in the form of wires 27, in Fig. 6, and in the form of tapes or strips 28 in Fig. 7, the arrangement in Fig. 7 differentiating from the preferred form only in the fact that tapes are shown instead of wire.

The depending ring-shaped annulus 26 is spaced from but in substantially the same horizontal plane as the field magnet and it surrounds the projecting ends of the pole pieces 18 and 19 so that when the pole pieces are energized by a suitable source of current, for example, through the conductor 29, the magnetic coils will become excited so as to cause a rotative movement to be imparted to the armature, specifically illustrated as the channel with the wire winding about it.

The rim 25 is connected to the hub 24 by the radial spokes 30 so that the turntable is in the form of a spider and between certain of the spokes are bracket plates 31 and 32, to which are pivotally mounted hanging governor weights 33 and 34 having brake shoes or faces 35 and 36, which may bear against the inner edge 37 of the magnet 17, when the governor weights 33 and 34 move out in response to speed of the turntable or armature. These weights are normally retracted by springs 38 and 39, which are connected to a sliding collar 40 splined to the shaft 8, the collar being adapted to be operated by an actuator consisting of a rock shaft 41, the end 42 of which engages the grooved portion 43 of the collar and the end 44 of which is accessible from the side of the machine so that the collar may be manipulated and thereby the tension of the springs 38 and 39 either increased or diminished to set the speed responsive governor to operate at a predetermined speed of the turntable.

The frame consisting of the sleeve 4, the arms 13 and 14 and the arms 13' and 14' supports a rigid square table 45 through the medium of the bracket arms 46, which are carried by the radial arms on the sleeve 4 and which underlie the table 45, as will be clearly seen in Fig. 3.

The table 45 carries a sound reproducing mechanism, generically designated 47. Since the details of the sound reproducing mechanism are immaterial, it will not be specifically described, it being deemed sufficient to refer simply to the stylus 48, which is to be introduced into the grooves of the sound reproducing record carried by the turntable hereinbefore described.

Figure 6:
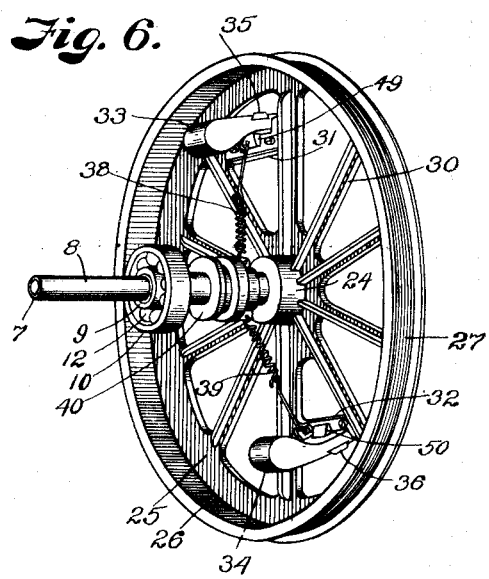
Fig. 6 is a detail perspective view of the armature or turntable tilted on end.
Figure 7:
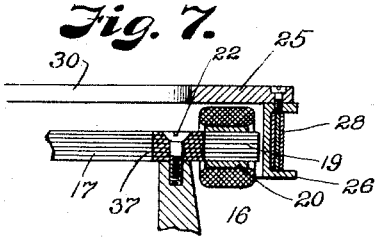
Fig. 7 is a fragmentary sectional view of a slightly modified form of armature.

By reference to Fig. 3 it will be apparent that the brake shoes carried by the weights 33 and 34 will be in close proximity to the inner edge of the magnet ring at all times because the inward swinging movement of the weights 33 and 34, under the influence of the springs 38 and 39, is limited by the stop lugs or projections 49 and 50 on the weights 33 and 34 and which are adapted to abut against the bracket plates 31 and 32, as will be clearly apparent by reference to Figs. 3 and 6.

I may equip the device with a cut-out switch 51 (see Fig. 2) if desired but this construction is well known and will need no detail description here.

When the parts are assembled and the magnetic field is excited, the pole pieces will magnetize the armature, causing a rotative movement to be imparted to the turntable, on which may be located the record. If the speed of the turntable becomes excessive the speed responsive brake members 33 and 34 will move out, due to centrifugal force, so as to bring the brake shoes into contact with the inner edge of the ring-shaped magnet so as to resist the tendency of the turntable to rotate at a speed in excess of a determined number of revolutions controlled by the position of the shiftable collar 40. When there is a reduction in the speed, the springs 38 and 39 will retract the members 33 and 34 inwardly away from the inner edge of the ring-shaped magnet, as seen in Fig. 3.

Since the shaft 8 rests only upon the ball 6 and since it is supported intermediate its ends by the bearing rings 9 and 10, the rotative movement of the motor may readily take place without appreciable friction losses and in operation, the motor will be practically noiseless so as not to detract from the tonal reproductions through the sound box and the amplifier or horn.

It will be apparent that the device can be readily installed in an ordinary conventional type of phonograph or sound reproducing machine, that it is simple in operation, easy to construct and inexpensive to manufacture.

What I claim and desire to secure by Letters Patent is:

1. A phonograph motor comprising a base frame, a vertical shaft in the base frame, a turntable carried by the shaft, a channel shaped annulus suspended from the turntable, magnetic material in the annulus, a ring-shaped magnet in line with the annulus and having radial pole pieces extending toward and terminating adjacent to the annulus, and speed responsive brake members carried by the turntable and adapted to contact with the inner edge of the magnet to effect braking.

2. A phonograph motor comprising a rotatable disk, a channel shaped annulus suspended from the disk, magnetic material within the annulus, a circular magnet within the space confined by the annulus having pole pieces adjacent thereto and braking means carried by the turntable and movable into functional position in response to the speed thereof.

3. A phonograph motor comprising an armature support, ring shaped laminations on said support, having paired, radial, offset pole pieces, coils on said pole pieces wound in multiple series, one of the pole pieces in each pair being sleeved to form a shaded pole magnet, a shaft revoluble in said base, a turntable on said shaft, a channel shaped annulus suspended from the turntable and surrounding the magnet and an armature coil in said channel.

In testimony whereof I affix my signature.

PERLEY P. BELT.